Figures 1, 2:
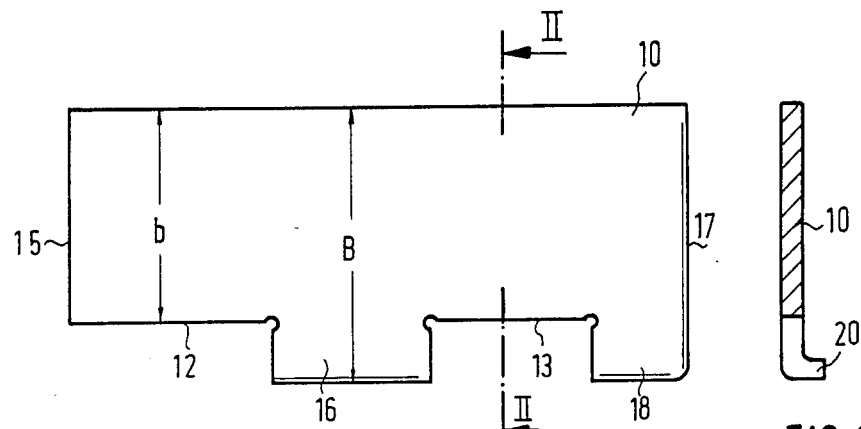

United States Patent [19]

Gerhard

[11] Patent Number: 4,682,923
[45] Date of Patent: Jul. 28, 1987

[54] DEVICE FOR LOCKING A CONTAINER

[75] Inventor: Helmut Gerhard, Weitefeld, Fed. Rep. of Germany

[73] Assignee: Westerwaelder Eisenwerk Gerhard GmbH, Fed. Rep. of Germany

[21] Appl. No.: 819,366

[22] Filed: Jan. 16, 1986

[30] Foreign Application Priority Data

Jan. 22, 1985 [DE] Fed. Rep. of Germany ....... 3501969

[51] Int. Cl.⁴ .............................................. B60P 7/13
[52] U.S. Cl. ....................................... 410/90; 410/76; 410/80
[58] Field of Search ........................ 410/52, 71, 73, 76, 410/77, 80, 82, 84, 85, 90, 91; 24/287; 220/1.5

[56] References Cited

U.S. PATENT DOCUMENTS

| | | | |
|---|---|---|---|
| 1,407,594 | 2/1922 | Smith | 410/84 |
| 3,601,866 | 8/1971 | Odin | 410/91 |
| 3,709,455 | 1/1973 | Last | 410/85 |
| 4,505,402 | 3/1985 | Gerhard | 220/1.5 |
| 4,521,941 | 6/1985 | Gerhard | 410/82 X |

FOREIGN PATENT DOCUMENTS 3239620 5/1984 Fed. Rep. of Germany .

Primary Examiner—Randolph A. Reese
Attorney, Agent, or Firm—Barnes & Thornburg

[57] ABSTRACT

Medium-size containers with corner fittings (21) that are not in accordance with ISO specifications may be locked to ISO locking elements (25) of the type provided on loading areas of container transport vehicles by means of locking plates (10) movably disposed inside the hollow frame elements (11) of the containers, provided the container frame has a corresponding width. The locking plate (10) has an overall width that corresponds to the clear diagonal dimension of the frame element (11) and is provided on its outer longitudinal edge with cut-outs (12, 13) in the region of which the remaining width of the locking plate corresponds to the clear width of the frame element (11). For locking the container, the locking plate (10) is adapted to be moved so that one (16) of the webs defined by the cut-outs (12, 13) extends outwards through an edge hole (22) that may be formed in the frame element (11) and a further web (18) extends outwards through a corner opening (28) of the corner fitting (21). In this locking position the locking plate (10) is pivoted from its diagonal rest position so as to lie flat on the bottom of the frame element (11) and the cut-out (13) is in engagement about the locking member (25).

25 Claims, 13 Drawing Figures

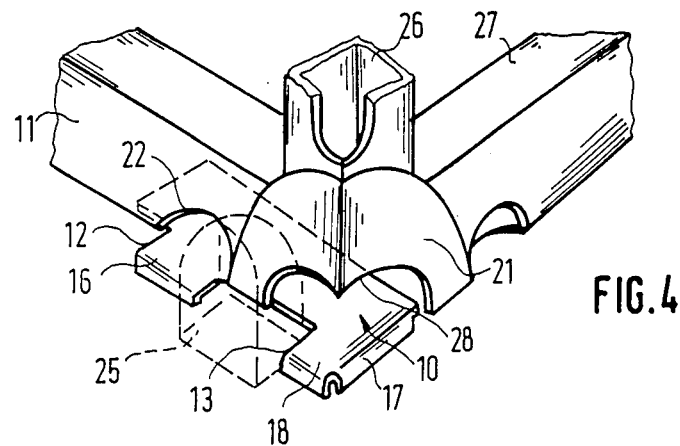
FIG. 4
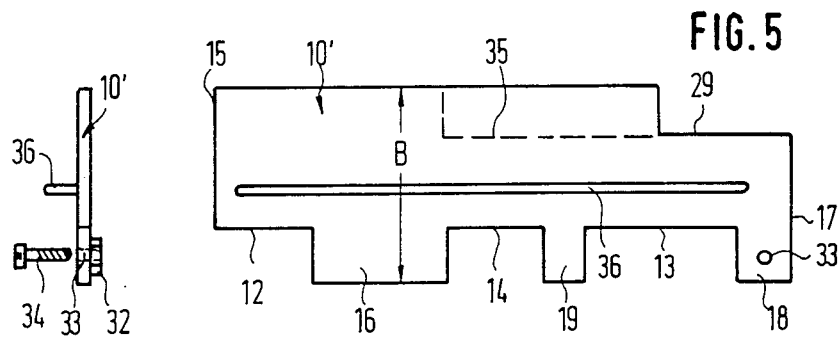
FIG. 5
FIG. 7
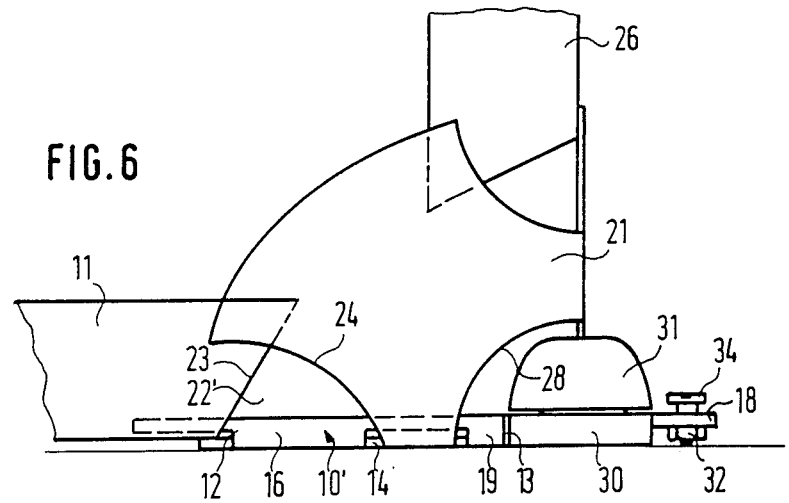
FIG. 6

DEVICE FOR LOCKING A CONTAINER

The invention is directed to a device for locking or arresting a container to locking members, which container is provided with lower frame elements of hollow rectangular section and with corner fittings each being formed with a corner opening.

A container including frame elements and corner fittings of this type is disclosed in the German Laid-Open Application No. 3,239,620. The concept involved is one which is especially suitable for medium containers of a width of 2200 mm, which are stackable only in twos or threes. If corner fittings according to ISO 1161 as provided for internationally standardized transcontainers with rated loads of up to more than 30 tons (this corresponds to about 300 kN) and at least sixfold full stackability were secured to such medium containers for rated loads of about 10 tons (this corresponds to about 100 kN), which corner fittings are correspondingly heavy and require appropriately dimensioned frame elements, such frame elements and corner fittings would be oversized by a factor 3 for medium containers. In contrast thereto, the corner fitting described in the mentioned Laid-Open Application is lighter and of smaller size and may be used in conjunction with correspondingly lighter frame elements of the type sufficient for medium containers; consequently, however, the corner fitting is not in accordance with ISO 1161 and may not readily be used with the twistlocks provided in said standard and mounted on the loading areas of vehicles intended for the transport of standardized containers. Moreover, the outer dimensions of the described medium containers deviate from the spacings at which the mentioned twistlocks or bolts are mounted on such vehicles.

It is an object of the invention to provide a device for locking containers of the above-specified kind to locking members such as provided on vehicle loading areas or on the decks of ships. A more specific object of the invention resides in locking containers with corner fittings that are not in accordance with the international standard ISO 1161 to standardized locking members, especially twistlocks according to ISO 1161.

The solution of this object in accordance with the invention includes providing locking pieces movable within a respective one of said lower frame elements including a portion adapted to extend outwards through the corner opening of the respective corner fitting with said portion having a cut-out for engaging a respective locking member. The locking pieces provided in accordance therewith, which are movable inside the frame elements of the container and are adapted to be partially passed outwards through the corner openings of the respective corner fittings, constitute a kind of transition pieces which, on the one hand, in the region intended for engagement with the locking members include cut-outs configured in accordance with the usually standardized respective locking members and on the other hand are adapted to be dimensioned in accordance with the respective predetermined spacing between pairs of two respective locking members provided transversely to the direction of travel. By being disposed inside the frame elements, the locking pieces may be designed as economic and simple accessories for the containers.

Advantages improvements of the invention are characterized in the dependent claims. The dependent claims include claims directed to the preferred arrangement where the locking pieces are formed as a substantially flat elongated plates having lateral cut-outs, providing a specially simple and weight-saving configuration of the locking pieces. Other dependent claims relate to the dimensioning of the plate so as to correspond to the clear diagonal dimension of the frame element and the width reduced by the depth of the lateral cut-outs to correspond to the clear width of the frame element, with special configurations of cut-outs on the plate for providing simple and functionally reliable measures for preventing withdrawal of the locking plate from the locking positions. Other dependent claims relate to the provision on preferred embodiments of the plate so as to have increased thickness protruding from the underside of the plate in the region of the webs defined by the cut-out, with certain embodiments providing the increased thickness as formed by a nut welded to the underside of a web, measures providing for level adjustment in the region of the locking plate. Other dependent claims relate to the provision on the plate of an abutment engaging the inner side of the surface of the corner fitting remote from the frame element, with special quarter-circular arc openings of the corner fittings having a clear radius dimension opening smaller than the overall width of the plate, whereby the locking plates are advantageously held captive inside the frame elements. Another dependent claim relates to the provision that the plate is provided with a corner recess extending to the front edge of the plate at its longitudinal side opposite to the cut-out, permitting insertion of the locking plate into the finished container frame. Another dependent claim relates to the provision of a reinforcing rib on the top surface of the plate. According to another dependent claim feature the locking plate is provided at the edge opposite to the cut-out, with means for engagement with the corner fitting within the area of the frame element which extends perpendicularly to that frame element, whereby the locking plate is supported in the direction of both lower frame elements connected to the respective corner fitting, thus anchoring the container at the corresponding locking member with even greater strength. Another dependent claim provides that the cut-out is formed as an opening completely surrounding the locking member, an arrangement which is particularly suitable in connection with a twistlock forming the locking member, wherein this twistlock is rotated upon fitting through the opening provided in the locking plate, whereby the container is retained also against tilting. The dependent claims are directed to preferred embodiments related to a locking piece which includes a hinge extending along the moving direction of the locking piece, with special configuration of the hinge parts to provide advantageous possibilities of housing the locking plate of greater width within the cross-section of the respective frame element.

Figure 3:
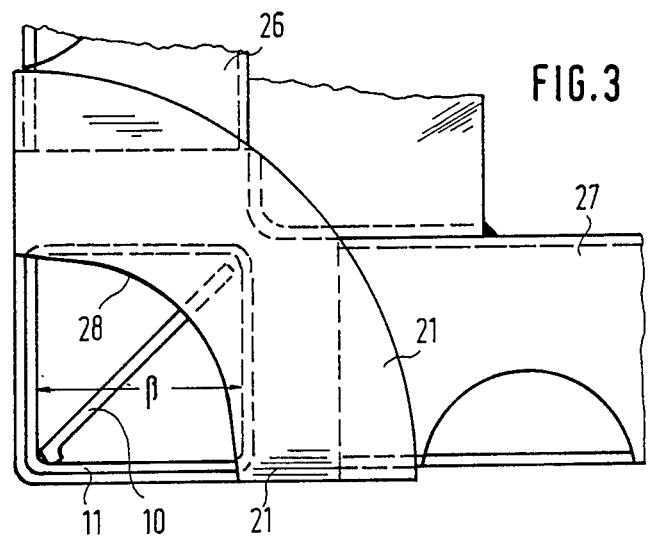
Figure 8:
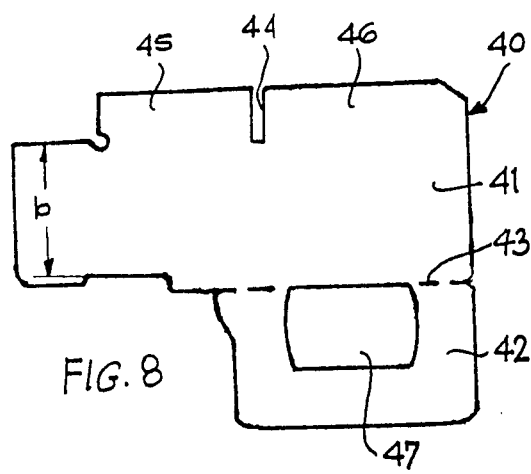
Figure 9:
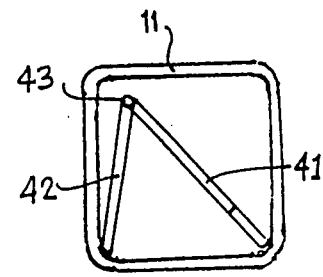
Figure 10:
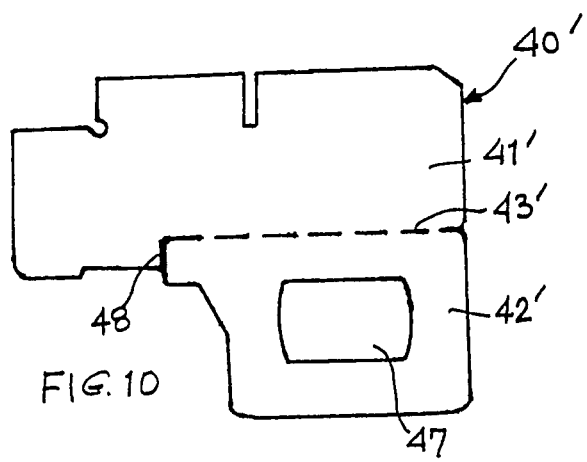
Figure 11:
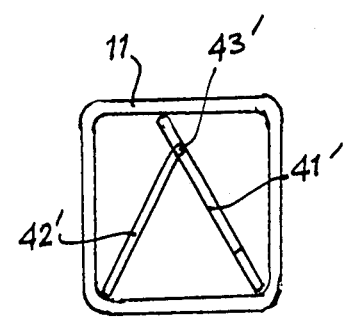
Figure 12:
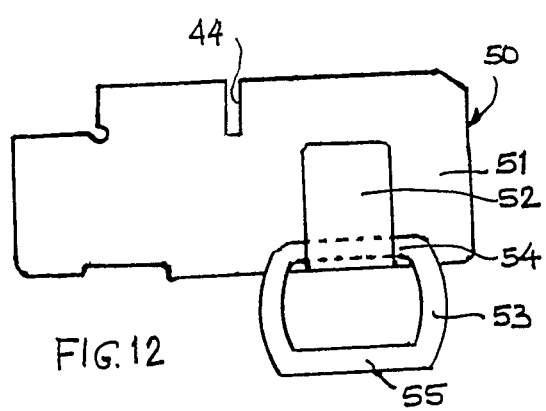
Figure 13:
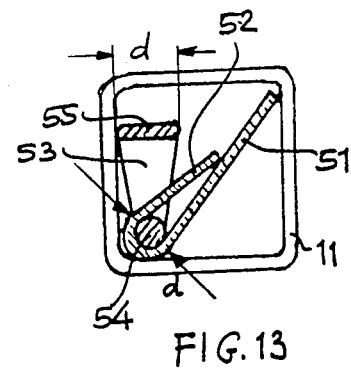

Preferred embodiments of the invention will be described below with reference to the drawings, in which FIG. 1 is a plan view of a locking plate according to a first embodiment, FIG. 2 is a cross-section through the locking plate along the line II—II of FIG. 1, FIG. 3 is a view of the locking plate according to FIG. 1 in the rest position when inserted in a container frame element, FIG. 4 is a perspective view of the arrangement of FIG. 3, but with the locking plate in its locked position, FIG. 5 is a plan view similar to FIG. 1 showing a locking plate according to a second embodiment, FIG. 6 is an illustration of a container corner with the locking plate of FIG. 5 in the locking position, FIG. 7 is a side view of the locking plate of FIG. 5, FIGS. 8, 10 and 12 are plan views of locking plates according to further embodiments, and FIG. 9, 11 and 13 are diagrammatic end views of container frame elements within which the locking plates of FIG. 8, 10 and 12, respectively, are shown in their rest position.

The flat-steel locking plate 10 shown in FIGS. 1 and 2 has an overall width B which is slightly less than the clear diagonal dimension of the container frame elements 11 shown in FIG. 3, which have rectangular and especially square cross-section. On one of its two longitudinal sides the locking plate 10 is provided with two cut-outs 12, 13 of which cut-out 12 extends right to the rear edge 15 of the locking plate 10 while the other cut-out 13 together with the cut-out 12 defines a web 16 and together with the front edge 17 of the locking plate 10 defines a web 18. The depth of the cut-outs 12 and 13 is selected such that the reduced width b of the locking plate 10 is somewhat less than the clear width β of the frame element 11 (FIG. 3).

As shown in FIG. 2, the locking plate 10 is provided in the area of the webs 16 and 18 and along the front edge 17 with enlargements 20 formed by rectangular bending. Instead, it is also possible to provide the webs with beads or creases. The thickness of said enlargements is substantially equal to the sum of the material thicknesses of the lower legs of the frame element 11 and of the corner fitting 21 (FIG. 3). As will be apparent from FIGS. 4 and 6, the thus dimensioned enlargements 20 have the effect that the lowermost surface of the locking plate 10 defined by them lies in the same plane as the bottom surface of the corner fitting 21. A further possible way of configuring the enlargements resides in the weld nuts described below with reference to FIG. 7.

The width of the web 16 of the locking plate shown in FIG. 1 is selected such that this web 16 may be passed through an edge hole 22 provided in accordance with FIG. 4 on the lower outer edge of the frame element 11. Depending on the configuration of the corner fitting 21, this edge hole 22 may also be provided in the corner fitting 21 itself, or it may be formed by corresponding cut-outs 23 on the frame element 11 and 24 on the corner fitting 21, as shown in FIG. 6.

Width and shape of the cut-out 13 depend on the width and shape of the locking member, which in FIG. 4 is indicated in dashed lines and is assumed to be a fixed bolt 25, for instance on the loading area of a vehicle, with respect to which the container comprising the frame elements 11, the corner fitting 21, and the locking plate 10 is to be locked. Such fixed bolts are provided especially on the loading areas of railway cars, where locking in vertical direction in order to accommodate vertical acceleration forces is not required. Especially, the bolt 25 may be configured such that it will fit into the corresponding lower location holes of standard corner fittings according to ISO 1161. The cut-out 13 on the locking plate 10 is configured to engage about said bolt 25 on three sides in the form of a C.

Thereby the container corner constituted in FIG. 4 by the frame elements 11, 26 and 27 and the corner fitting 21 is fixed in three directions, viz., in either direction of the longitudinal extension of the frame element 11 and in one direction of the longitudinal extension of the frame element 27. Locking in the fourth horizontal direction is achieved by the provision of a further locking plate 10 in the region of the other end of the frame element 27 in FIG. 4, said locking plate 10 being provided with a cut-out open in opposite direction relative to the cut-out 13 of the locking plate 10 shown in FIG. 4 and having said cut-out in engagement about a bolt disposed in said region.

FIG. 3 shows the locking plate 10 in the rest position in which it is pushed into the frame element 11. In its diagonal position the locking plate is fully accommodated in the frame element 11. On the end of the frame element 11 facing the corner fitting 21 or even inside the frame element, shaped portions (not illustrated) cooperating with corresponding shaped portions (also not illustrated) on the locking plate 10 may be provided to prevent the locking plate 10 when in its rest position from slipping too far into the frame element.

Dropping-out of the locking plate 10 is prevented due to the fact that the corner hole 28 of the corner fitting 21, which for instance is configured as a quarter circle according to FIG. 3, is so dimensioned that the remaining clear radius dimension is smaller than the overall width B of the locking plate 10. When the container is manufactured, the locking plate 10 is pushed into the frame element 11 prior to application of the corner fitting 21.

In FIG. 3, the frame element 11 is shown to have a square cross-section. Alternatively, lower frame elements having a rectangular cross-section can be installed in such a manner that their longer side extends vertically. In this case, locking plates having a larger overall width B may be used. Since the clear width β of the frame element and thus the reduced width b of the locking plate are unchanged, the amount by which the webs 16 and 18 extend beyond the width b then becomes greater so that the locking member is encompassed to an accordingly greater extent.

In use, the container to be locked is placed onto the respective loading area in such a way between two bolts 25 disposed along a transverse vehicle axis that these bolts are adjacent two corner fittings 21. Thereupon the two locking plates 10 in their diagonal position illustrated in FIG. 3 are drawn out to such an extent that the web 16 may pass through the edge hole 22 and the cut-out 13 may engage around the respective bolt 25. In this position the locking plate 10 drops into its horizontal position shown in FIG. 4, in which it locks the container relative to the bolt 25. The front edge 17 of the locking plate 10 may either abut the respective inner wall of the corner fitting or may terminate shortly before the same. In this position the locking plate 10 lies with its lower main surface flat on the lower leg of the frame element 11 and with the bottom face of the enlargements 20 lies on the loading area.

The enlargement 20 may also be sufficiently thick to impart to the locking plate 10 when in the locking position shown in FIG. 4 a slight inward inclination, which acts against inadvertent pivoting of the locking plate 10 into the nonlocked position.

The embodiment of the locking plate 10' illustrated in FIG. 5 differs from the one shown in FIG. 1 in that a third, central cut-out 14 is provided which together with the rear cut-out 12 defines the web 16 and with the front cut-out 13 defines a further web 19. Moreover, the locking plate 10' according to FIG. 5 is provided on the opposite longitudinal side with a recess 29 extending right to the front edge 7, said recess having the effect that the locking plate 10' in its inclined position may be extended by a corresponding length through the corner opening 28 out of the corner fitting 21.

In the locking position shown in FIG. 6 the web 16 of the locking plate 10' passes through the edge hole 22' defined by the cut-outs 23 and 24 on the frame element 11 and the corner fitting 21, respectively, and the cut-out 13 engages about the foot 30 of the locking member, which in this embodiment is configured as a twistlock 31 in accordance with ISO 1161, wherein the web 19 fits between the corner opening 28 and said foot 30. Due to the fact that the locking plate 10' is adapted to be extended for some distance out of the corner fitting 21 and the cut-out 13 in the extended locking position lies outside by a corresponding distance, the container is now fixed relative to the locking member in such a way that the latter is fully in the region of the corner opening 28. When, as assumed in FIG. 6, the locking member is configured as a twistlock, the head thereof may be twisted and now causes locking of the locking plate 10' and thus of the container also in vertical direction. Such a twistlock fixing against vertical acceleration is indicated especially when containers are transported on loading areas of road vehicles.

In conjunction with a locking operation on a twistlock shown in FIG. 6 it may be appropriate to provide the enlargement of the locking plate 10' by means of nuts 32 (FIG. 7) of corresponding thickness rather than by means of the bent portions shown at 20 in FIG. 2, said nuts being welded to the underside of the locking plate 10' in the region of the webs 16, 18, 19. As illustrated in FIG. 5, the web 18 is moreover provided with a bore 33 which is in alignment with the threaded bore of the nut 32. When the locking plate 10' has been locked by means of the twistlock 31 of FIG. 6, this locking assembly may additionally be tightened by means of a tightening screw 34 threaded from above through the nut 32 and extending from the underside thereof. The same tightening may also be provided, if required, in the region of the web 19 according to FIGS. 5 and 6. When the locking plate webs are elevated in this way by means of tightening screws, a wedge effect will moreover result between the side edges of the webs 16, 19 and the adjacent bordering edges of the edge hole 22 and the corner opening 28, said wedge effect improving the strength of the locking assembly.

As indicated in dashed lines in FIG. 5, the corner recess 29 may be extended considerably towards the rear, so that the cut defining this extended corner opening 35 towards the rear is approximately in alignment with the edge defined between the web 16 and the cut-out 14. With this configuration the locking plate 10' may be manoeuvred into the frame element 11 even after securing of the corner fitting 21 through the corner opening 28 of the latter, but in that case it will be very securely retained against inadvertent dropping-out. The overall width B, which in this configuration will only remain in the region of the web 16, is sufficient for the proper functioning of the locking plate 10'. To improve the rigidity of the locking plate 10' it is further possible to provide on the top surface thereof a reinforcing rib 36 extending in longitudinal direction of the plate. If required, this rib may also have sections branching into the regions of the webs 16, 18 and 19. A similar reinforcing rib may also be suitable in the locking plate 10 according to FIG. 1, provided the required rigidity is not achieved by the thickness of the plate material.

The locking plate 40 shown in FIG. 8 consists of two plates 41 and 42 interconnected by a schematically shown hinge 43. At its left end the plate 41 has a portion of the width b which corresponds to the width b in FIG. 1 and is slightly smaller than the clear width 8 of the frame element 11 indicated in FIG. 3. The main portion of the plate 41 has a larger width and includes a slot 44 extending from the edge of the plate 41 opposite to the hinge, so that two projections 45 and 46 are produced at this edge. The plate 42 is provided with an oblong opening 47 which is so shaped that it fits over a twistlock according to ISO 1161. In the embodiment of FIG. 8, the axis of the hinge 43 extends along the inner edge of the opening 47.

FIG. 9 shows how the locking plate 40 of FIG. 8 in its rest position can be completely inserted into the frame element 11. For anchoring the container, the locking plate 40 is withdrawn from the frame element to such an extent that the projection 45 is positioned in the area in which the lower frame element 27, which extends perpendicularly to the frame element 11, terminates at the corner fitting 21. When the locking plate 40 is now unfolded to its straight condition, the slot 44 will engage the wall of the corner fitting 21, with the projection 46 being outside the corner fitting 21. The opening 47 surrounds the locking member. In case this locking member is formed by a twistlock, the latter will subsequently be rotated by 90° to retain the locking plate 40, thus the container against both sliding and tilting.

The locking plate 40' shown in FIG. 10 distinguishes from the locking plate 40 of FIG. 8 in that the axis of the hinge 43' is positioned outside the opening 47 so that both plates 41' and 42' have substnatially the same width. In this case, the hinge 43' terminates at its left-hand end at a cut 48. FIG. 11 shows how the locking plate 40' of FIG. 10 is housed in its rest position within the frame element 11.

The locking plate 50 of FIGS. 12 and 13 has a plate 51 the main portion of which substantially corresponds to the shape of the plate 41 of FIG. 8. At its edge opposite to the slot 44, a flap 52 is formed integrally with the plate 51, which flap 52 extends through a ring 53 and is folded back onto the main portion of the plate 51. As shown in FIG. 13, the cross-section of the inner leg 54 of the ring 53 is circular so that the ring 53 is connected to the plate 51 in a hinge-like rotatable manner. The outer leg 55 of the ring 53 has a thickness which is equal to the sum of the diameter of the inner leg 54 and twice the thickness of the plate 51. This measure is indicated at d in FIG. 13 and is so selected that the outer ring leg 55 in the working position of the locking plate 50, stands vertically on the support when the plate 51 lies flatly on the inner surface of the frame element 11. The clear dimension of the ring 53 available in view of the thickness of the flap 52 forming the hinge corresponds to the shape of the opening 47 in the locking plates of FIG. 8 and 10.

It has been assumed in all above embodiments that the locking plate is inserted into the frame element 11 and secured there against becoming lost when not used for locking or arresting the container. Alternatively, the frame element 11 or the frame element 27 may be provided at its upper inner edge in the vicinity of the corner fitting 21 with a slot, and the locking plate may be inserted through such slot into the respective frame element. This manner of storing the locking plate may be suitable if the overall width of the locking plate is larger than the clear diagonal dimension of the frame element and the locking plate has no hinge.

What is claimed is:

1. A device for locking a container to locking members, the container including lower frame elements of hollow section and lower corner fittings each formed with a corner opening, said device comprising a locking piece movable within a respective one of said lower frame elements between a retracted non-use position in said hollow section and an in-use position, said locking piece including a portion adapted to extend outwards through the corner opening of the respective corner fitting when in said in-use position, said portion having a cut-out for engaging a respective locking member.

2. A device as claimed in claim 1, wherein said cut-out is formed as an opening completely surrounding said locking member.

3. A device as claimed in claim 2, wherein the locking piece includes a hinge extending along the moving direction of said locking piece.

4. A device as claimed in claim 3, wherein said hinge extends along the inner confining line of said opening.

5. A device as claimed in claim 4, wherein said opening is formed by a ring having an inner leg extending through an eye formed by a folded-back portion of said plate.

6. A device as claimed in claim 5, wherein the thickness of the outer ring leg is identical to the sum of the thickness of the inner ring leg and twice the thickness of the folded-back portion of said plate.

7. A device as claimed in claim 1, wherein said lower frame elements are of hollow rectangular section.

8. A device as claimed in claim 1, wherein said locking piece is formed as a substantially flat elongated plate having lateral cut-outs.

9. A device as claimed in claim 8, wherein the overall width of said plate corresponds to the clear diagonal dimension of said frame element and the width reduced by the depth of said lateral cut-outs correspond to the clear width of said frame element.

10. A device as claimed in claim 9, wherein said plate has a position of increased thickness protruding from the underside of the plate in the region of said webs defined by said cut-outs.

11. A device as claimed in claim 10, wherein said increased thickness corresponds to the sum of the material thicknesses of the lower legs of said corner fitting and of said frame element.

12. A device as claimed in claim 10, wherein said portion of increased thickness is formed by a nut welded to the underside of a web, a tightening screw being threadable into said nut.

13. A device for locking a container to locking members, the container including lower frame elements of hollow rectangular section and lower corner fittings each formed with a corner opening, said device comprising locking pieces each movable within a respective one of said lower frame elements and including a portion adapted to extend outwards through the corner opening of the respective corner fitting, said portion having a cut-out for engaging a respective locking member, wherein said locking piece is formed as a substantially flat elongated plate having lateral cut-outs.

14. A device as claimed in claim 13, wherein the overall width of said plate corresponds to the clear diagonal dimension of said frame element and the width reduced by the depth of said lateral cut-outs corresponds to the clear width of said frame element.

15. A device as claimed in claim 14, wherein said plate is provided on one longitudinal side thereof with two cutouts, one cut-out extending to the rear edge of said plate remote from the corner fitting, and the other cut-out having a width corresponding to the shape of said locking member.

16. A device as claimed in claim 15, wherein at least one of said frame element and the corner fitting has an edge hole in an outer edge facing away from the container, and wherein a web defined between the two cut-outs of said plate has a width that corresponds to the clear length of said edge hole.

17. A device as claimed in claim 16, wherein said plate includes three cut-outs on said longitudinal side, two of said cut-outs defining a web engaging between one edge of said corner opening of the corner fitting and that surface of the said locking member which faces said edge.

18. A device as claimed in claim 15, wherein said plate on its longitudinal side opposite to said cut-outs includes a corner recess extending to the front edge of the plate.

19. A device as claimed in claim 13, wherein said plate has a position of increased thickness protruding from the underside of the plate in the region of said webs defined by said cut-outs.

20. A device as claimed in claim 19, wherein said increased thickness corresponds to the sum of the material thicknesses of the lower legs of said corner fitting and of said frame element.

21. A device as claimed in claim 19, wherein said portion of increased thickness is formed by a nut welded to the 22. A device as claimed in claim 13, wherein said plate has an edge portion for abutting an inner surface of said corner fitting.

23. A device as claimed in claim 22, wherein said corner opening of said corner fitting is defined by quarter-circular arcs, the clear radius dimension of the correr opening being smaller than the overall width of said plate.

24. A device as claimed in claim 13, wherein said plate includes a reinforcing rib on its top surface.

25. A device as claimed in claim 13, wherein each corner fitting interconnects two of said lower frame elements extending perpendicularly to each other, and wherein said plate, at its edge opposite to said cut-out for engagement with said locking member, is provided with means for engagement with said corner fitting within the area of the frame element which extends perpendicularly to that frame element which receives said plate.

* * * * *

UNITED STATES PATENT AND TRADEMARK OFFICE
CERTIFICATE OF CORRECTION

PATENT NO. : 4,682,923
DATED : July 28, 1987
INVENTOR(S) : Helmut Gerhard

It is certified that error appears in the above-identified patent and that said Letters Patent is hereby corrected as shown below:

Column 7, line 11, change "in" to --to--.

Signed and Sealed this

Seventeenth Day of December, 1991

Attest:

*Attesting Officer*

HARRY F. MANBECK, JR.

*Commissioner of Patents and Trademarks*